United States Patent [19]

Revell

[11] 4,124,361
[45] Nov. 7, 1978

[54] SEALING DEVICE FOR FILTER CELLS
[75] Inventor: Alan E. Revell, Louisville, Ky.
[73] Assignee: American Air Filter Company, Inc., Louisville, Ky.
[21] Appl. No.: 795,892
[22] Filed: May 11, 1977
[51] Int. Cl.[2] .................. F16L 37/20; B10D 39/00
[52] U.S. Cl. ................................... 55/493; 285/311; 277/101
[58] Field of Search ............... 55/481, 493, 490, 484; 285/311, 420

[56] References Cited
U.S. PATENT DOCUMENTS 3,393,498  7/1968  Schoen ................................. 55/493
3,409,315  11/1968  Jewell ................................. 285/311

Primary Examiner—Robert I. Smith
Attorney, Agent, or Firm—Jon C. Winger

[57] ABSTRACT

A sealing device for a plurality of flow-through filter cells in a filter cell housing including a longitudinally extending toggle joint support member extending through opposed side walls of the housing and a plurality of toggle joints mounted at the knees onto the toggle joint support member, the toggle joints having one end pivotally mounted to the frame of the housing and the other end including engaging means engageable with the filter cells upon longitudinal movement of the support member.

5 Claims, 10 Drawing Figures

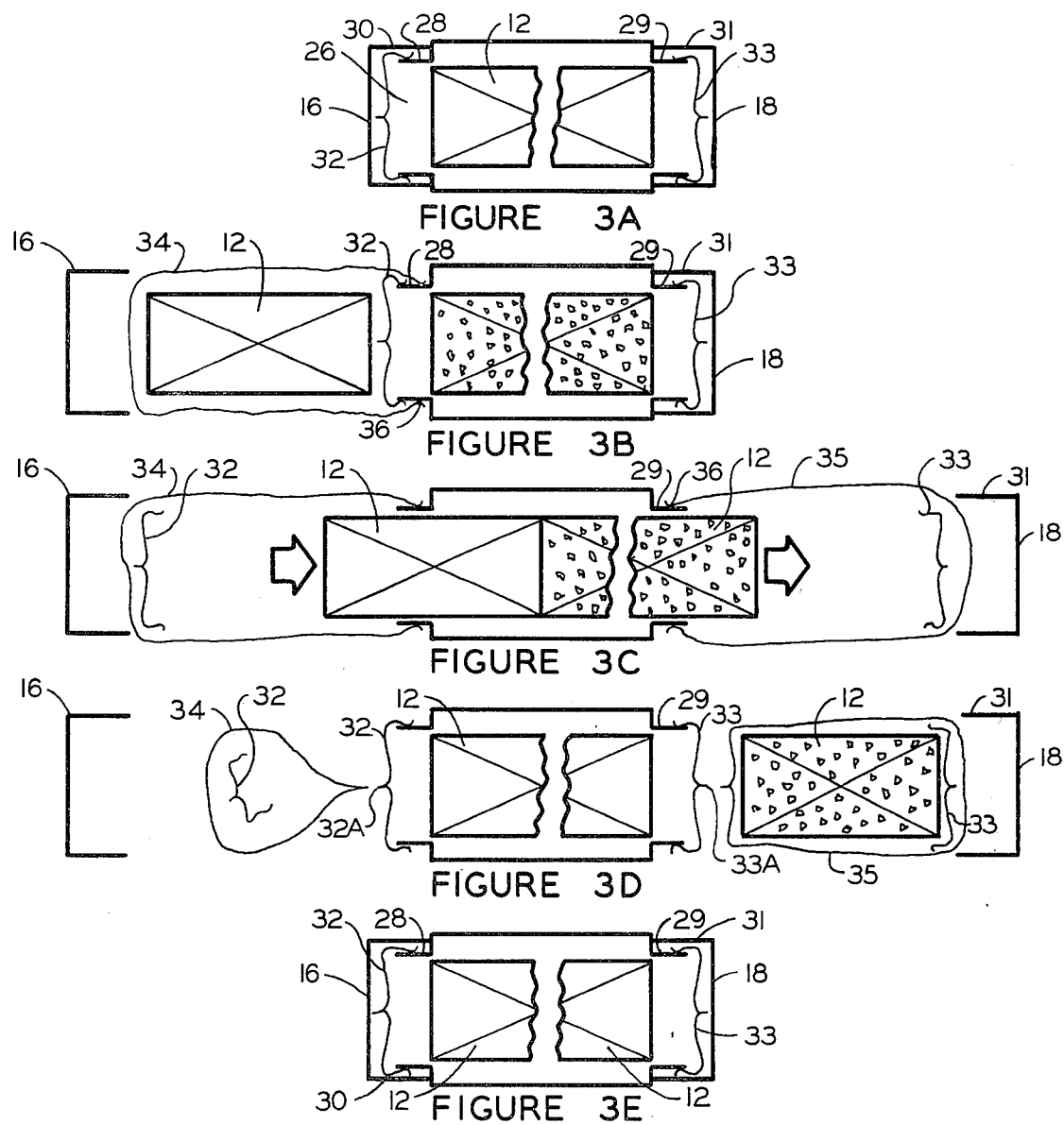

SEALING DEVICE FOR FILTER CELLS

BACKGROUND OF THE INVENTION

1. Field of the Invention

The present invention relates to a filter assembly for a gas stream and more particularly to a new, useful and unobvious arrangement for sealing a plurality of filter cells in a filter cell support housing.

2. Description of the Prior Art

In the prior art, a number of filter cell sealing and retaining arrangements are known in which a filter cell is firmly held in sealed relation to the frame of its support structure. These past arrangements of the prior art have included complex screw-down mechanisms, compressable spring devices slidably pressing directly against the cell frames, and cam and wedging devices, all of which have included a large number of operating parts, all of which have been complex in manufacture, assembly, as well as high in cost.

SUMMARY OF THE INVENTION

The present invention, recognizing that the arrangements of the prior art have presented problems in sealing, particularly in gas streams wherein a minute amount of leakage around the seal creates hazardous conditions, the prior art has presented problems in sealing, as well as in construction, installation, wear and gas stream resistance. The novel assembly of the present invention is straightforward and economical to manufacture and install utilizing a minimum number of parts and yet assures an effective seal along the overall peripheral sealing edge between a filter cell frame and a flow-through opening in a filter cell housing.

Various other features of the present invention will become obvious to one skilled in the art upon reading the disclosure set forth hereinafter.

More particularly, the present invention provides in a flow-through filter cell support housing adapted to receive and support a plurality of filter cell means disposed between a dirty gas inlet passage and a clean gas outlet passage with peripheral edges of the filter cell means abutting against an aligned peripheral seal mounted around one of the passages, an improved filter cell sealing and retaining means comprising: a toggle joint support member longitudinally extending through the housing; toggle joints knee means mounted to the longitudinal support member, one end of the toggle joints being pivotally mounted to the frame of the housing and the other end including engaging means thereon engageable with the filter cell upon movement of the longitudinal support member.

It is to be understood that the description of the examples of the present invention given hereinafter are not by way of limitation and various modifications within the scope of the present invention will occur to those skilled in the art upon reading the disclosure set forth hereinafter.

BRIEF DESCRIPTION OF THE DRAWING

Referring to the drawing:

FIGS. 3a–3e are schematic views showing the installation and removal of filter cells from a filter arrangement of the present invention;

DESCRIPTION OF THE PREFERRED EMBODIMENT

Figure 1:
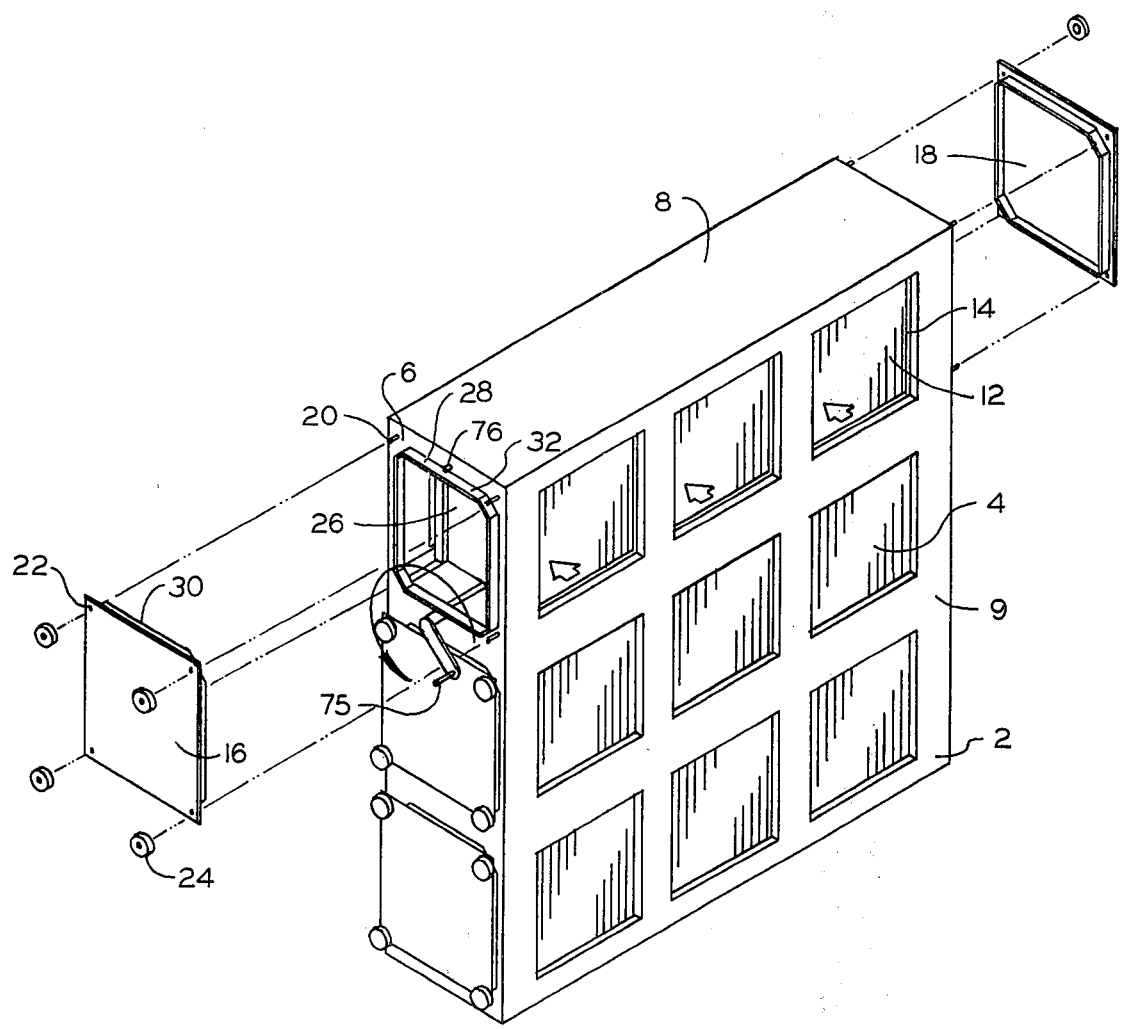
FIG. 1 is a perspective view, with selected portions in explosion, of a filter arrangement of the present invention.
Figure 2:
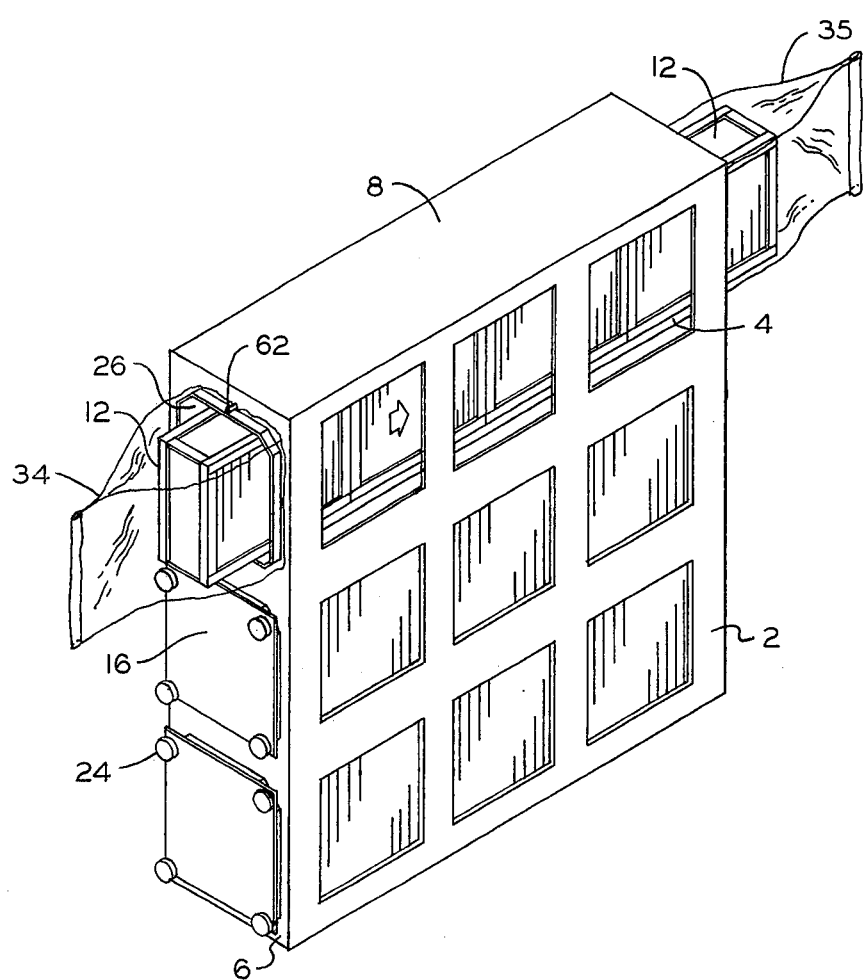
FIG. 2 is a perspective view of the filter arrangement of FIG. 1 showing the installation and removal of filter cells from the filter arrangement.

Referring to FIGS. 1 and 2 of the drawing, there is disclosed a flow-through housing 2 having a dirty gas inlet (not shown) and a plurality of clean gas outlet passages 4 therein. Housing 2, as disclosed, in rectangular in shape and is formed from spaced opposed vertically extending side wall members, only wall member 6 being shown, between which are mounted in spaced relation from each other opposed horizontally extending top and bottom panel members, only top panel member 8 being shown.

The clean gas outlet, as shown, includes the plurality of passages 4 therein, each passage being in flow-through alignment with a filter cell 12. The filter cells 12, as best shown in FIG. 2, are in abutting side-by-side relation so that upon adjustment of the sealing means, to be discussed hereinafter, the filter cells 12 are in fluid tight sealing relation with the peripheral edge 14 of each flow-through passage 4. As shown in FIG. 1, upon release of the sealing means the filter cells 12 move inwardly as noted by the arrows away from the peripheral edge 14 and into the housing 2.

As shown in the exploded portion of FIG. 1 and the schematics of FIGS. 3a–3e, three filter cells 12 are in side-by-side horizontal alignment and are easily removed when a filter cell becomes dirty or contaminated without exposing the operator to the material which is caught during the filtering process. Removable access doors 16 and 18 on opposed side walls, only side wall 6 being shown, are easily removed as shown. Around the periphery of the panel access door 16 is a plurality of threaded members 20, members 20 being attached at preselected locations around the periphery of the access door 16 extending through aligned openings 22 in the door 16 to receive nuts 24 thereon. The access door 16 is provided with a peripheral flange 30 extending inwardly to fit over an opening 26 in the side wall 6, flange 30 fitting tightly against the side wall 6. Around the opening 26 and extending outwardly therefrom is a flange member 28, flange member 28 being disposed to receive the stub 32 of a plastic bag as discussed hereinafter.

In FIGS. 2 and 3a–e it is shown how filter cells 12 of the present invention are removed and replaced without subjecting the operator to contamination. In FIG. 3a a single horizontal bank of filters are shown with the access doors 16 and 18 in place with polyethylene stubs 32 and 33 mounted in sealing relation around the flanges 28 and 29, respectively, on each side of the bank of filter cells 12. In FIG. 3b, access door 16 is removed and a clean filter cell 12 contained within a polyethylene bag 34 having an open end 36 is placed over the stub 32 and around the flange 28. In FIG. 3c, access door 18 is removed and a polyethylene bag 35 having an open end 36 is placed around the flange 29 and the stub 33 is hand manipulated into the bag. On the opposed side, polyethylene stub 32 is hand manipulated into the bag 34 and the clean filter cell is pushed through the access opening 26 (FIG. 2) and on the opposite side the dirty filter cell 12 (FIG. 2) is pushed out into the plastic bag 35.

In FIG. 3d the clean filter cell 12 is in place and the filter bag 34 is heat sealed and cut at 32a by any known means with the contaminated polyethylene stub 32 remaining in the bag and the new or clean polyethylene stub 32 is then in place snugly fit around the flange 28. On the opposite side of the housing the contaminated or dirty filter cell 12 is heat sealed into the bag 35 and cut by any known means.

In FIG. 3e the access doors 16 and 18 are in place and the filter arrangement is in the same position as shown in FIG. 3a.

Figure 4:
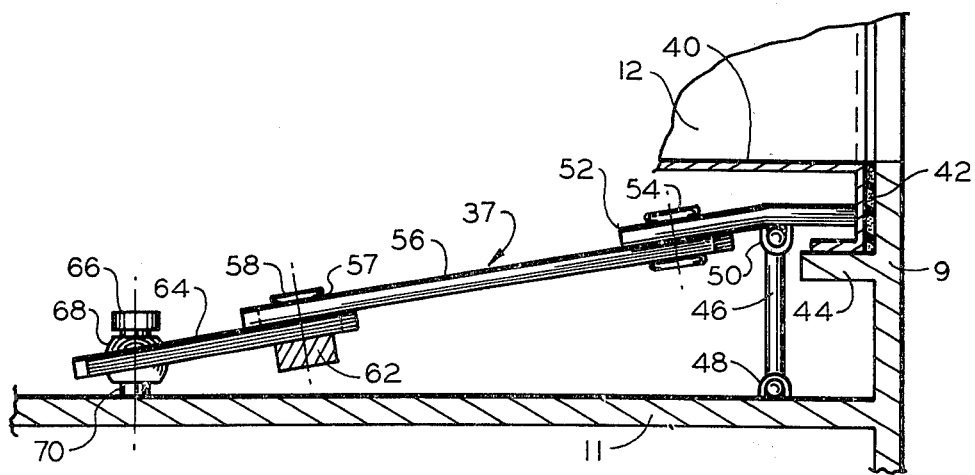
FIG. 4 is an enlarged end view, partially in section, of a sealing and retaining device of the present invention in a sealing and retaining position.

In FIG. 4 a sealing and retaining device is shown in sealing and retaining engagement with a filter cell 12. The sealing device includes a plurality of toggle joints 37 mounted at the knee portion 57 to a lontigudinally extending elongated flat toggle joint support member 62 which extends through opposed sides, only side 6 being shown, of the filter housing 2. Toggle joint 37 is provided with a link member 56 attached at one end to the knee 57 and the other end to a finger 52 which is engageable with the bottom wall 40 of filter cell 12, bottom wall 40 of filter cell 12 being provided with a U-shaped mounting section 41 for engageably receiving finger 52 and disposed to be slidably received by a slide rail 44, slide rail 44 being weldably attached to the back wall 9 of the housing 2. The finger 52 is attached to the link member 56 by a rivet 54 or other well known means such as a bolt and nut. Also, the finger 52 is swingably engagable with the mounting section 41 and as shown in FIG. 4 engaging section 41 forcing section 41 into sealing relation with back wall 9 with a gasket 42 disposed therebetween, gasket 42 being adhesively secured to the mounting section 41. Means for providing movement of the finger 52 is a swingable joint comprised of an eyelet 50 on the underside of the finger 52 with an oval shaped guide link 46 movably received therein. The guide link 46 is also received by an eyelet 48 which is weldably attached to horizontally extending flat plate frame member 11, flat plate frame member 11 extending from side wall member 6 to the opposite side wall member of the housing 1.

The link member 56 at the knee joint 57 is connected by a threaded member 58 to link member 64 and toggle support member 62. Link member 64 is attached at its opposed end to a swivel ball 68 by cap screw 66. Swivel ball 68 having an opening therethrough to receive cap screw 66 is mounted onto a spacer 70 which is attached to the support member 11. Swivel ball 68 engages movement of the toggle joint upon engaging and disengaging of the finger 52 with the U-shaped mounting portion 41 of filter cell 12.

Figure 5:
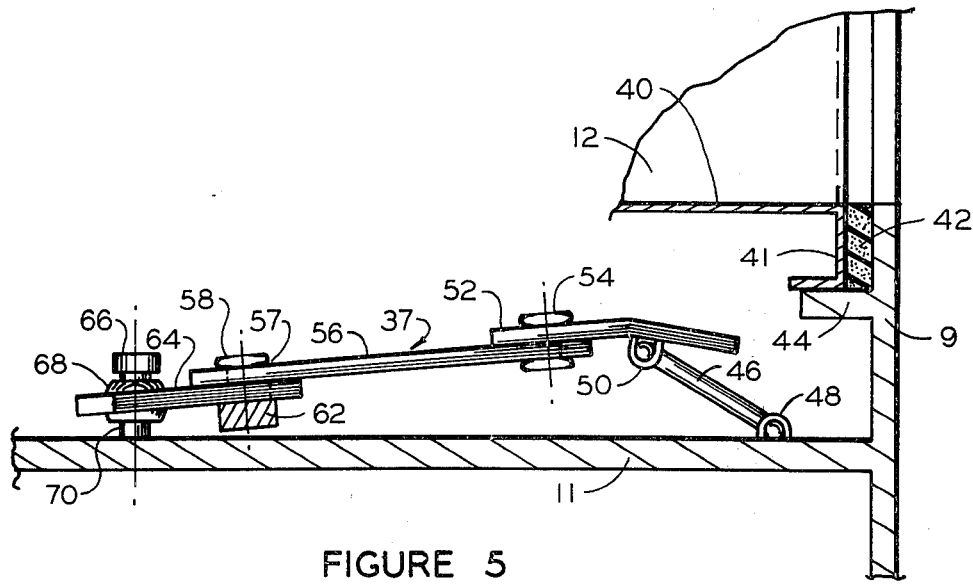
FIG. 5 is an enlarged end view, partially in section, of the sealing and retaining device of FIG. 4 in a non-sealing position; and, FIG. 6 is a top view of the sealing and retaining device of FIG. 4.

In FIG. 5 the sealing and retaining device described in FIG. 4 is shown in a disengaged or non-sealing position.

Figure 6:
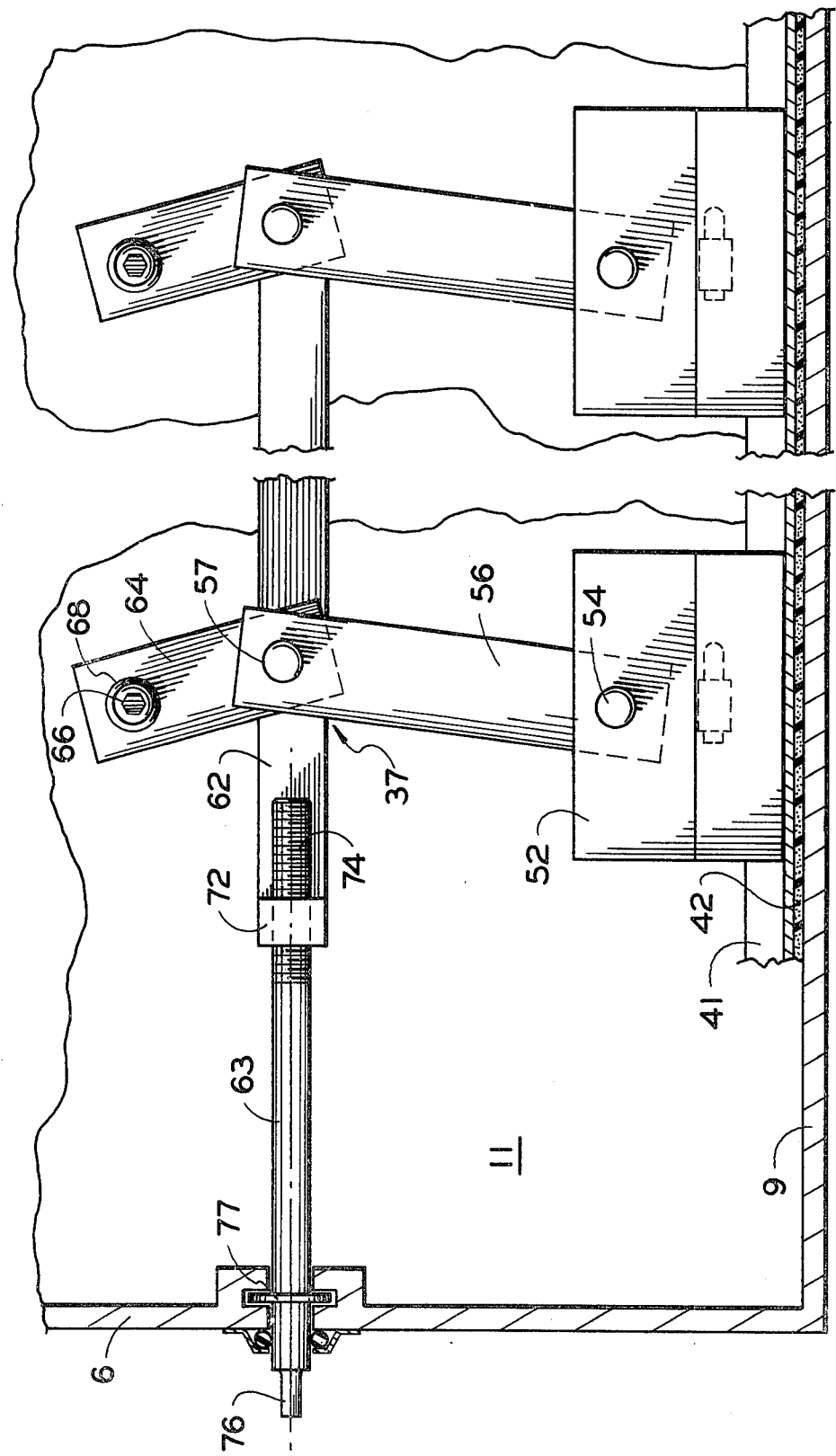

In FIG. 6 the sealing device is shown to show the connection between the elongated flat member 62 and the means for longitudinal movement of member 62 in the engaging and disengaging movement of toggle joints 37. The flat member 62 is provided with a rectangular-shaped block 72 at one end thereof with a threaded aperture (not shown) therethrough to receive the threaded end 74 of an elongated rod member 63. Rod member 63 extends through the side wall 6 and is supported by a thrust bearing 77. Rod member 63 is further provided with a male portion 76 at the end thereof to receive the female portion of a handle 75 (FIG. 1) so that the sealing means is operable from outside the housing 1. As shown, upon rotatable movement of the rod members 63, toggle joint support member 62 moves longitudinally thereof bending toggle joint 37 at the knees 57. Bending of knees 57 forces finger 52 into and out of engaging relation with U-shaped mounting portion 41.

It is realized that a plurality of sealing devices may be utilized for each horizontal bank of filter cells 12 to give better sealing of the filter cells to the frame and in a preferred embodiment the ends of rod members 63 are covered by the access doors 16 when the filter assembly is in operation.

It will be realized that various changes may be made to the specific embodiment as shown and described without departing from the principles of the present invention.

What is claimed is:

1. In a flow-through filter cell support housing adapted to receive and support filter cell means disposed between a dirty gas inlet passage and a clean gas outlet passage with peripheral edges of the filter cell means abutting against an aligned peripheral seal mounted around one of the passages, an improved filter cell sealing and retaining means comprising:
    a toggle joint support member longitudinally extending through said housing;
    a plurality of toggle joints spaced apart along the longitudinal axis of said toggle joint support member, each toggle joint having a pair of link members joined together at one end at a knee portion and pivotally connected to said toggle joint support member at said knee portion, and each toggle joint being pivotally mounted at one end of one of its link members to the frame of the filter cell support housing; and, engaging means attached to one end of the other toggle joint link member engageable with the filter cell means upon longitudinal movement of the toggle support member.

2. The device according to claim 1 wherein said engaging means comprises a swingably mounted finger pivotally connected to the one end of the other toggle joint link member, said finger swingably engaging said filter cell means and forcing said filter cell means against and into sealing engagement with its aligned peripheral seal.

3. The device according to claim 1, said toggle joint support member including an elongated flat member having thread means on one end thereof rotatably receiving a threaded end of a rotatably mounted rod, said rod extending through one side of said support housing, said toggle joints being mounted onto said flat member whereby rotation of said rod longitudinally moves said flat member.

4. The device according to claim 1, said toggle joint support member extending through opposed side walls of said housing.

5. The device according to claim 1, further comprising a guide link having one end pivotally attached to the frame of the housing and having its other end pivotally connected to said engaging means.

* * * * *